United States Patent [19]

Iwata et al.

[11] 4,119,988

[45] Oct. 10, 1978

[54] CAMERA USING INSTANT PRINT FILM

[75] Inventors: Hiroshi Iwata, Nara; Tetsuo Yamaoka, Osaka, both of Japan

[73] Assignee: West Electric Co., Ltd., Osaka, Japan

[21] Appl. No.: 831,808

[22] Filed: Sep. 9, 1977

[30] Foreign Application Priority Data

Sep. 14, 1976 [JP] Japan .............................. 51-110304

[51] Int. Cl.² ............................................. G03B 17/50
[52] U.S. Cl. ...................................... 354/289; 354/83
[58] Field of Search .............. 354/60 L, 83, 289, 299, 354/53, 54, 219; 340/228 R

[56] References Cited

U.S. PATENT DOCUMENTS

| 3,457,846 | 7/1969 | Little | 354/83 X |
|---|---|---|---|
| 3,604,329 | 9/1971 | Land | 354/299 X |

Primary Examiner—Michael L. Gellner
Attorney, Agent, or Firm—Burgess, Ryan and Wayne

[57] ABSTRACT

A camera using an instant print film wherein when the environmental temperature is outside the permissible temperature range in which a print with satisfactory qualities may be obtained, a light emitting element lights up, giving an alarm signal to a user indicating that he must adjust a developing time interval and/or an exposure value so that an optimum print may be obtained.

3 Claims, 4 Drawing Figures

CAMERA USING INSTANT PRINT FILM

BACKGROUND OF THE INVENTION

The present invention relates to generally a camera of the type wherein an instant print film is loaded, exposed and immediately developed into a print.

There have been invented and demonstrated various types of camera wherein an instant print film including a developing and fixing agent is loaded and unloaded manually or automatically from the camera after exposure and is immediately developed into a print. In general, the development of an exposed film is much susceptible to the environmental temperature, and the development of an instant print film is no exception. For instance, assume that the instant print films be developed for a predetermined time interval regardless of the environmental temperature. Then when the environmental temperature is high, the print thus developed exhibits a pronounced dark tone. On the other hand when the environmental temperature is low, the print exhibits a light tone. Therefore a user must sense the environmental temperature depending upon his experience and a sixth sense or with a thermometer so that he may suitably adjust an exposure value and/or developing time interval so as to minimize the adverse effects of the environmental temperature on the qualities of a print.

However one cannot exactly sense the environmental temperature depending upon his experience and a sixth sense alone, and it is very inconvenient for him to always carry a thermometer in order to measure the environmental temperature every time when he takes a picture. Furthermore when the user neglects to measure the environmental temperature and adjust the developing time interval and/or exposure value, no satisfactory print acan be obtained.

SUMMARY OF THE INVENTION

One of the objects of the present invention is therefore to provide a camera using an instant print film when the environmental temperature is outside of the permissible temperature range, an alarm signal is generated to warn the user that the developing time interval and/or the exposure value must be adjusted depending upon the environmental temperature so that a satisfactory print may be obtained.

Another object of the present invention is to provide a camera using an instant print film of the type described above and where when the alarm signal is generated, an optimum exposure value and/or developing time interval depending upon the environmental temperature may be indicated so that the exact adjustment of the developing time interval and/or exposure value may be made.

Briefly stated, to the above and other ends the present invention provides a camera using an instant print film wherein when a temperature sensing circuit detects an environmental temperature higher or lower than the permissible temperature range, a switching circuit is enabled to light up an indicator or a light emitting element, giving an alarm to a user.

DESCRIPTION OF THE PREFERRED EMBODIMENTS

Figure 1:
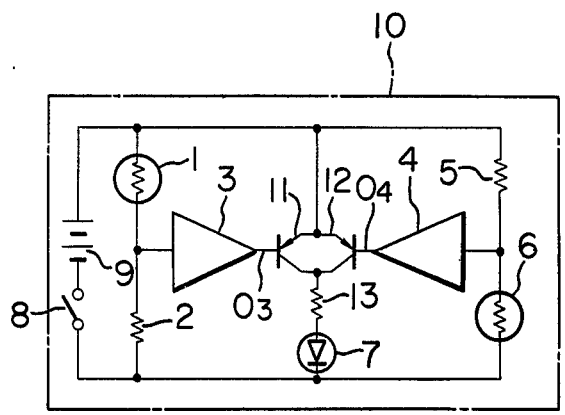
FIG. 1 is a circuit diagram of an alarm device in accordance with the present invention for giving an alarm signal to a user when the environmental temperature is outside of the permissible temperature range.

In FIG. 1 there is shown a circuit diagram of a warning device incorporated into a camera using instant print films. The warning device comprises two temperature sensing elements 1 and 6 having the same negative temperature coefficient, resistors 2 and 5 connected in series to the temperature sensing elements 1 and 6, respectively, for dividing a voltage of power supply 9, comparators 3 and 4 to which are applied input voltages divided by the temperature sensing elements 1 and 6 and the resistors 2 and 5, two transistors 11 and 12 having their bases connected to the outputs of the comparators 3 and 4 and a light emitting indicator 7 such as a light emitting diode, a neon bulb, an incandescent lamp or the like connected through a resistor 13 to the junction between the collectors of the transistors 11 and 12.

A switch 8 is operatively connected to a shutter button (not shown) and is closed when the shutter button is depressed halfway.

Let denote the values of the temperature sensing elements 1 and 6 when the environmental temperature is high by $R_{tH1}$ and $R_{tH6}$, respectively, and the values when the environmental temperature is low by $R_{tL1}$ and $R_{tL6}$, respectively. Then the inputs to the comparators 3 and 4 when the environmental temperature is high or low are given by $$E_{3H} = V \times (R_2/R_2 + R_{tH1}) \quad (1)$$

$$E_{4H} = V \times (R_{tH6}/R_5 + R_{tH6}) \quad (2)$$

$$E_{3L} = V \times (R_2/R_2 + R_{tL1}) \quad (3)$$

$$E_{4L} = V \times (R_{tL6}/R_5 + R_{tL6}) \quad (4)$$

where $V$ = a voltage of the power supply 9, and $R_2$ and $R_5$ = values of the resistor 2 and 5, respectively.

It is assumed that the comparators 3 and 4 be CMOS, products of RCA Corp. Then the CMOS comparators 3 and 4 operate on a voltage one half of the voltage V of the power supply 9. That is, the operating voltages $V_{T3}$ and $V_{T4}$ of the comparators 3 and 4 are $$V_{T3} = V_{T4} = V/2$$

Thus when $V_{T3} < E_{3H}$, the output $O_3$ of the comparator 3 is at a low level, and when $V_{T4} > E_{4H}$, the output $O_4$ of the comparator 4 is at a high level. Therefore when $V_{T3} < E_{3H}$ and $V_{T4} > E_{4H}$, the transistor 11 is enabled so that the light emitting element 7 lights up.

On the other hand, when the environmental temperature is too low; that is, when $V_{T4} < E_{4L}$ and $V_{T3} > E_{3L}$, the output $O_4$ of the comparator 4 is at a low level and the output $O_3$ of the comparator 3 is a high level. As a result, the transistor 12 is enabled that the light emitting element 7 lights up.

Thus when the values of the resistors 2 and 5 are suitably selected in such a way that when the environmental temperature is higher or lower than a permissible temperature range, the output $O_3$ or $O_4$ of the comparator 3 or 4 is at a low level, the light emitting element 7 lights up, warning the user that the environmental temperature is too high or too low so that he must take suitable countermeasures. That is, in response to the warning, the user may adjust a developing interval of time and/or an exposure value so that a satisfactory print may be obtained. However when he adjusts the developing time and/or the exposure value depending upon his experience and a sixth sense, no satisfactory print will not be obtained so that the present invention includes an indicator for indicating an optimum developing time or exposure value depending upon the environmental temperature as will be described below with reference to FIGS. 2A and 2B.

Figure 2A:
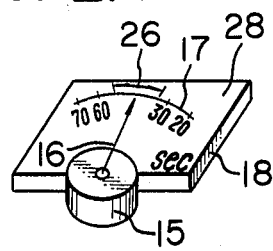
FIG. 2A is a perspective view of a developing time interval indicator for indicating an optimum developing time interval when the environmental temperature is outside of the permissible range.

First referring to FIG. 2A, an optimum developing time indicator 18 comprises a conventional bimetallic thermometer 15 with a pointer 16 which indicates a "seconds" graduation or mark graduated on a scale 17; that is, an optimum developing time interval depending upon the environmental temperature.

Figure 2B:
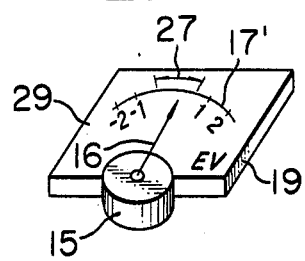
FIG. 2B is a perspective view of an exposure value indicator for indicating an optimum exposure value when the environmental temperature is outside of the permissible temperature range.

In an exposure meter 19 shown in FIG. 2B, the pointer 16 of the bimetallic thermometer 15 indicates an optimum exposure value EV marked on a scale 17' depending upon the environmental temperature.

However when the pointer 16 indicates a range 26 or 27 on the scale 17 or 17', no developing time interval or exposure adjustment is required, but when the pointer indicates a developing time interval or exposure value outside of this range 26 or 27, the user must adjust the developing time interval or exposure value accordingly. For instance, assume that the pointer 16 of the exposure meter 19 shown in FIG. 2B indicates the exposure value EV2. Then the user must turn a tone control knob (not shown) for controlling the tone of a print to be developed and sets it to EV2. Thus he may obtain a satisfactory print.

Figure 3:
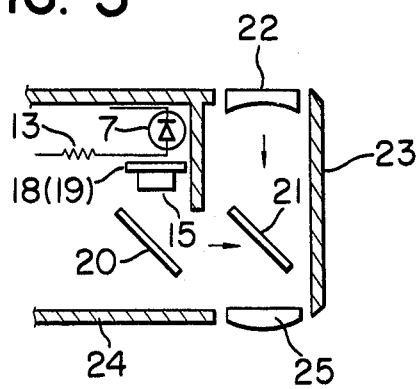
FIG. 3 is a schematic view showing the arrangement of a light emitting element in the alarm device shown in FIG. 1 and the developing time interval or exposure value indicator within the camera.

FIG. 3 shows the light emitting element 7 of the warning device 10 shown in FIG. 1 disposed within a black box 24 of the camera in such a way that a transparent panel 28 or 29 of the indicator 18 or 19 may be illuminated by the light-emitting element 7. Therefore the user may view not only the scale 17 or 17' and the pointer 16 through a mirror 20, a half-mirror 21 and a lens 25 but also a subject through a lens 22 and the half-mirror 21.

As described above, when the environmental temperature is within the permissible range, the light-emitting element 7 will not light up so that the user may not view the pointer 16 and the scale 17 or 17'. On the other hand, when the environmental temperature is outside the permissible range, the warning element 7 lights up so that the user may see an optimum developing time interval or exposure value indicated by the pointer 16 and may adjust or set the developing time interval or exposure value accordingly in the manner described above. Thus the user may obtain a satisfactory print.

So far the optimum developing time interval and exposure value indicators 18 and 19 have been described as being provided separately, but it will be understood that they may be combined into a single indicator. That is, the exposure value scale 17' may be graduated on the panel 28 in parallel with the developing time interval scale 17 so that the user may select the developing time interval or exposure value adjustment whichever is easier.

What is claimed is:

1. In a camera using an instant print film of the type wherein an instant print film is loaded, exposed and then immediately developed into a print, an improvement comprising
    (a) a temperature sensing circuit including temperature sensing elements for sensing whether or not the environmental temperature is within a permissible temperature range at which a print with satisfactory qualities may be obtained,
    (b) a switching circuit which is enabled when the environmental temperature sensed by said temperature sensing circuit is outside of said permissible temperature range,
    (c) an indicator circuit including a light emitting element which is electrically connected to said switching circuit in such a way that said light emitting element may light up when said switching circuit is enabled, and
    (d) a power supply for said temperature sensing circuit, said switching circuit and said indicator circuit, whereby when the environmental temperature is outside of said permissible temperature range, said light emitting element lights up giving a warning signal.

2. An improvement as set forth in claim 1 further comprising
    a developing time interval indicator comprising a thermometer with a pointer the deflection of which is a function of the environmental temperature, a scale graduated or marked with developing time interval in seconds, and said pointer and said scale being so disposed as to be illuminated by said light emitting element when the latter lights up; and
    an optical system so arranged that one may view a developing time interval indicated by said pointer on said scale through a viewfinder of said camera.

3. An improvement as set forth in claim 1 further comprising
    an exposure value indicator comprising a thermometer with a pointer the deflection of which is a function of the environmental temperature, an EV scale graduated with exposure values of EVs, and said pointer and said scale being so disposed as to be illuminated by said light emitting element when the latter lights up; and
    an optical system so arranged that one may view an exposure value indicated by said pointer on said scale through a viewfinder of said camera.

* * * * *

UNITED STATES PATENT OFFICE
CERTIFICATE OF CORRECTION

Patent No. 4,119,988     Dated October 10, 1978

Inventor(s) Hiroshi Iwata, et al

It is certified that error appears in the above-identified patent and that said Letters Patent are hereby corrected as shown below:

Column 1, line 37: "acan" should be --can--

Column 4, line 10: after "adjustment" insert a comma

Signed and Sealed this

Fifteenth Day of May 1979

[SEAL]

Attest:

RUTH C. MASON  
Attesting Officer

DONALD W. BANNER  
Commissioner of Patents and Trademarks